United States Patent Office 3,275,613
Patented Sept. 27, 1966

3,275,613
PROCESS FOR PREPARING ALPHA-OLEFIN POLYMERS WHICH ARE SUBSTANTIALLY FREE OF RESIDUAL CATALYST
Donald D. Emrick, Maple Heights, Robert J. Sating, Lakewood, and Roman Zorska, Cleveland, Ohio, assignors to The Standard Oil Company, Cleveland, Ohio, a corporation of Ohio
No Drawing. Filed Feb. 6, 1963, Ser. No. 256,554
6 Claims. (Cl. 260—93.7)

This invention relates to a novel process for the preparation of polypropylene and other poly-alpha-olefins which are substantially free of residual catalyst and more particularly pertains to the process for polymerizing propylene and other alpha-olefins at relatively low pressure wherein the polymeric products are easily isolated in relatively pure form without the necessity for the usual clean-up procedures.

The catalyst employed in the present invention is an extremely active form of the catalyst composition more fully disclosed in the copending U.S. patent application of Donald D. Emrick, Serial No. 180,039, filed March 15, 1962, now abandoned.

The original research carried out by Natta et al. on the polymerization of propylene, Angewandte Chemie 69, 213–219 (1957), used a modified Ziegler catalyst system, now referred to as a Ziegler-Natta system, composed of titanium trichloride and triethyl aluminum at relatively low temperatures and pressures.

The Ziegler catalysts, which usually are composed of various mixtures of aluminum alkyls and titanium halides, have been shown to make possible the production of isotactic polyolefins, and even cis-polyisoprene and cis-polybutadiene. This structure control presumably is due to the stereospecificity of the carbon-metal bond in the propagation step. However, recent work has shown that the polymerization mechanism involved in these heterogeneous systems is much more complex than at first appeared, and difficult to elucidate. Indeed, the course followed by the polymerization is determined to an extraordinary degree by the various molecular species of catalyst that may be present and what might be thought to constitute minor variations in catalyst species introduced into the catalyst system have been shown to result in unpredictable changes of surprising magnitude in the rate of reaction, and in the stereoregularity and other properties of the polyolefin produced.

The known catalyst systems employing titanium trichloride and diethyl aluminum chloride or triethyl aluminum frequently produce polypropylene together with a rather high proportion of liquid or amorphous polypropylene. The liquid products are separated from the crude semi-solid and solid materials formed in the reaction. At times more than one-third of the propylene reacted can be consumed in the formation of such low order liquid and semi-solid polymers, which are not useful and must be discarded.

The solid material that is obtained is contaminated with catalyst and catalyst residues and has a varying degree of isotacticity, determined by boiling the product with heptane. The desired material of high stereoregularity is insoluble in n-heptane or isooctane. It has a higher molecular weight and a higher tacticity than the heptane-soluble material, as shown by X-ray and infrared crystallinity determinations. The material soluble in heptane is relatively amorphous, usually has a lower molecular weight, and is not useful for structural applications.

In addition to n-heptane extraction to remove amorphous material, the highly stereoregular polypropylene as usually prepared must be freed from entrained catalyst. It is well known that many products tenaciously retain the catalyst, which can be removed only by exhaustive and meticulous extraction methods with such materials as acetone, carbon tetrachloride, an aliphatic alcohol containing from 1 to 4 carbon atoms or acids such as hydrochloric acid or hydrogen chloride gas. The polypropylene products are usually further purified by washing with hot alcohol in several stages as disclosed in U.S. Patent No. 2,976,271, for instance.

It has been stated that one of the most difficult steps in producing structural polypropylenes is the removal of the organo-metallic coordination catalyst used in its manufacture (see, for instanec, Chemical Week, May 21, 1960, pages 83–84, January 12, 1963, page 32 et seq., and Chemical Engineering, June 27, 1960, pages 96–99).

In order to make structural polypropylene of satisfactory electrical properties, heat, light and color stability, and to prevent corrosion of process equipment employed in the fabrication of the polymer, it is necessary to purify it and remove or reduce the level of the catalyst to a very low level.

It is the usual procedure after the crude polypropylene has been filtered or centrifuged from the hydrocarbon reaction medium to reslurry the polymer with an extractant such as weak hydrogen chloride in methanol, isopropanol or butanol to decompose the catalyst. Usually this step is conducted in the absence of air. The extractant is then removed in another centrifuge or filter step. The polymer is then washed with several changes of water to remove all traces of hydrogen chloride and is then steam treated to remove all traces of solvent, and then dried. For some uses, a corrosion inhibitor may be added to absorb any remaining traces of corrosive materials rather than attempting to remove them completely. The subject of ash removal has been well treated in a recent book entitled "Polyolefin Resin Processes," by M. Sittig, Gulf Publishing Co., Houston, Texas, 1961.

In regard to the preparation of substantially catalyst-free polypropylene, it should be mentioned that it is known to use the dynamic techniques of (a) flow turbulence of solvent media about a supported fixed bed of a titanium trichloride-trialkyl aluminum catalyst and (b) centrifugal force with a stainless steel basketed catalyst for directing streamers of growing polypropylene away from a physically restrained catalyst, the overall effect probably being the production of major portions of polymer substantially free of catalyst particles as disclosed in U.S. Patents Nos. 2,291,954 and 2,935,495. In contrast, the present process employs a novel, extremely active catalyst, is a static system and is not subjected to the bed fouling difficulties associated with the prior art methods.

In accordance with the present invention, a process for polymerizing propylene and other alpha-olefins is provided, which is capable of providing high yields of an exceptionally stereoregular or isotatic polymer which is substantially free of catalyst residues at unusually high rates of polymerization. These results are obtained by use of a novel, reactive form of the four component catalyst system, more fully disclosed in the aforementioned copending U.S. patent application, Serial No. 180,039. The four essential components of this catalyst system are (1) a halide of a metal selected from the group consisting of metals of Groups IV(b), V(b), and VI(b) of the Periodic Table in an oxidation state below the maximum for the metal; (2) an organoaluminum hydrocarbon; (3) an organoaluminum monohalide; and (4) an organic phosphine, arsine or stibine or mixtures thereof. This catalyst system apparently forms a catalytically active complex or association of the four components which is different from a mere mixture thereof and which effects the polymerization of the alpha-olefin at elevated temperatures and pressures.

Halides of any metal of Groups IV(b), V(b) and VI(b) forming catalytic halides can be employed. It is preferred that the metal be in an oxidation state below its maximum. In the case of the Group IV(b) metals, the preferred valence state is less than 4. In the case of the Group V(b) metals, the preferred valence state is less than 5. In the case of the Group VI(b) metals, the preferred valence state is less than 6. Typical Group IV(b) metals are titanium, zirconium, and hafnium. Typical Group V(b) metals are vanadium and tantalum. Typical Group VI(b) metals are molybdenum and chromium.

Any halide of these metals may be employed. The chlorides are most readily available and least expensive, and are therefore preferred. The bromides and iodides can also be used. Titanium trichloride is the preferred halide of this group because it tends to give more crystalline, more stereoregular polymers than the other halides.

As the organoaluminum monohalide, any compound can be employed having the formula:

wherein X represents a halogen such as chlorine, bromine and iodine and $R_1$ and $R_2$ represent hydrocarbon radicals having from 1 to 12 carbon atoms and preferably from 1 to 3 carbon atoms.

The organoaluminum hydrocarbon component has the following formula:

wherein $R_1$, $R_2$ ad $R_3$ each represents a hydrocarbon radical having from 1 to 12 carbon atoms and in the above formulae $R_1$, $R_2$ and $R_3$ can be the same or different radicals.

Most preferred as the (4) component are the organic phosphines. Exemplary of the organic phosphines are triethyl phosphine, tri-n-butyl phosphine, triisopropyl phosphine, tri-n-propyl phosphine, tri-n-amyl phosphine, diethyl isobutyl phosphine, diethyl phenyl phosphine, diphenyl n-propyl phosphine, triisooctyl phosphine, tri-n-hexyl phosphine, tri-n-decyl phosphine, triundecyl phosphine, tridodecyl phosphine, methyl diisooctyl phosphine, triphenyl phosphine, tricyclohexyl phosphine, tribenzyl phosphine, tritolyl phosphine and the like.

The polymerization process of this invention is applicable to any alpha-olefin. The preferred alpha-olefins are ethylene, propylene and mixtures of these two in any proportions. The process is applicable to any alpha-olefin of the formula $R—CH=CH_2$, in which R is hydrogen or an organic saturated or unsaturated hydrocarbon radical having from 1 to about 12 carbon atoms, preferably hydrogen or a radical having from 1 to about 5 carbon atoms. The alpha-olefins include both mono- and poly-unsaturated olefins such as the conjugated and nonconjugated dienes. Typical higher alpha-olefins, higher than propylene in molecular weight, include butene-1, 2-methyl butene-1, pentene-1, octene-1, heptene-1, decene-1, hexene-1, dodecene-1, 2-ethylhexene-1, styrene, butadiene-1, 3, isoprene, 1,3-pentadiene and others.

In the present invention advantage is taken of the discovery that a substantially catalyst-free polymer will grow in a fungus-like growth from liquid propylene, for instance, which is in contact with an extremely active, high surface area catalyst which in turn is supported on an initially formed low pressure polymer. Under certain conditions this polymer growth leads to a high degree of catalyst segregation through the formtaion of highly differentiated solid sections of polymer. The end result is a high degree of catalyst restriction or segregation. The present process produces high yields and high degree of conversion to nearly or potentially solvent-free, substantially catalyst-free polymer which is ready for many commercial uses without further treatment.

The preparation of the active catalyst embodied herein is exemplified by a catalyst system containing titanium trichloride, triethyl aluminum, diethyl aluminum chloride and a trialkyl phosphine. In a typical preparation, a very finely divided titanium trichloride is mixed with triethyl aluminum, diethyl aluminum chloride and a trialkyl phosphine in Decalin at a temperature of from 10 to 120° C. and preferably from 40 to 100° C. at a relatively high concentration; that is, about 0.01 to 0.1 molar in titanium in a highly naphthenic liquid boiling preferably about 190° C. at atmospheric pressure such as decalin. Typical catalysts of this type contain on a molar basis at least equal amounts of triethyl aluminum and diethyl aluminum chloride and preferably an excess of triethyl aluminum and they also contain an overall aluminum to titanium ratio of about 2 to 4:1 and a titanium to phosphorous ratio of about 0.5 to 2.0:1. The resulting product is then aged at about room conditions for from about 1 to 24 hours and preferably from about 2 to 6 hours and is then diluted with about 2 to 3 times its volume of inert hydrocarbon diluent such as liquified propane, n-butane, decalin, n-heptane, purified kerosine, purified diesel oil, heavy gasoline alkylate, toluene, trimethyl pentane, cyclohexane and the like.

The polymerization process is then carried out employing the above described active catalyst. The active catalyst is cautiously contacted with gaseous propylene at a partial pressure of about 10 to 135 p.s.i.g. at 38 to 90° C., with stirring and efficient cooling, for a period of about 5 to 20 minutes so as to produce a finely divided catalyst largely dispersed in or largely supported by the initially formed semi-solid low pressure polymer dispersion. Liquid propylene is then very carefully brought in contact with the initially formed pasty polymer which is dispersed over as wide an area as possible with the available equipment which contains the still very active catalyst, care being taken not to unduly mix the initial catalyst containing layer with the liquid propylene layer. The reaction is then allowed to continue at from about 50 to 90° C., and preferably 60 to 80° C., for a period ranging from 1 to 24 hours and preferably from 2 to 10 hours or until most or all of the liquified propylene has polymerized to solid polymer. It is essential that the polymerization reaction be carried out under static conditions in the absence of stirring or any other type of agitation. Usually adequate provision for the absorption of the very large heat of polymerization must also be provided for. It is not necessary, however, that the reaction be a batch reaction since it is within the scope of the present process to carry out a continuous or intermittent reaction in suitable equipment.

The major phase of dense, solid polypropylene derived principally from liquid propylene is easily differentiated from the lower initially produced and more loose polymer phase. By carefully adjusting the liquid propylene contact conditions, reaction variables, and general operating procedure, the major amount of the polymer produced can be obtained so as to contain only a minor amount of the initial inorganic catalyst components as assayed by ashing. The assayed ash, catalyst and halogen level of the segregated or differentiated dense polymer is low enough so that it can be suitably processed or inhibited and sold without the usual necessity for chemical extraction of the embedded catalyst. The loose, more highly catalyst-contaminated polymer can be conveniently removed from the substantially catalyst-free dense polymer by mechanical means such as a screen and shaker apparatus.

In order to prepare solvent- and catalyst-free polymer by the process of this invention, it is frequently convenient after the active catalyst has been prepared in the foregoing manner to centrifuge off the major portion of the relatively poorly volatile Decalin from the Decalin suspension of the titanium trichloride catalyst component and resuspend the particulate titanium trichloride in a much more volatile solvent such as n-butane, n-pentane, or even n-heptane or trimethyl pentane. Likewise, the solvent media utilized for the preparation of the initial catalyst may be wholly or partially substituted by such highly volatile hydrocarbons.

As a further control of polymer molecular weight in the present process, hydrogen gas can be introduced into the reaction mixture to serve as a chain stopper, preventing the formation of excessively high molecular weight polymer. The use of small amounts of hydrogen in combination with these catalyst systems can increase ratios of conversion by as much as 60% and increase the proportion of heptane-insoluble crude polymer to 95–99%, as well as decrease the average molecular weight. Other molecular weight modifiers such as cadmium salts and alkyls are known to the art and can be employed in the present process.

The following examples will further illustrate the process of this invention.

*Example I*

Using a 2000 ml. capacity Parr autoclave fitted with an internal cooling coil, a catalyst mixture was prepared from 50 mls. of a freshly stirred, high surface area, violet 0.0505 molar, titanium trichloride suspension in 2,2,4-trimethylpentane and 43 ml. of mixed 0.113 molar triethyl aluminum, 0.067 molar diethyl aluminum chloride and 0.0597 molar tri-n-butyl phosphine in 2,2,4-trimethyl pentane. The violet titanium trichloride suspension (containing co-crystallized aluminum chloride) was originally prepared in Decalin from a 3:1 molar ratio of titanium tetrachloride and triethyl aluminum at 140–145° C. for 70 minutes followed by centrifugation and replacement of the Decalin with 2,2,4-trimethylpentane. Next about 250 ml. of liquified instrument grade n-butane was added to the stirred autoclave by means of slight nitrogen pressure. A pressure of 135±10 p.s.i.g. of chemically pure grade propylene was applied to the reaction mixture from an external source and the reaction was continued at about 38° C. to 40° C., with stirring, for a period of 17 minutes (partial pressure of propylene was about 60–70 p.s.i.). The stirrer was then turned off and a 250 ml. portion of liquified chemically pure propylene was then added over a 20 minute period to the top of the unstirred and unagitated contents of the autoclave. After a six minute interval, a second 250 ml. portion of liquified propylene was added over a 20 minute period, and similarly a third portion over a 17 minute period (about 750 ml. of liquified propylene in all). During this addition of liquid propylene, the reaction temperature was maintained at 50–80° C. The reaction was then allowed to continue unstirred for a period of about 15 hours at about 65° C. The autoclave was then depressurized to remove the n-butane and excess propylene. The resulting mass of crude solid polymer was nearly free of solvent and it was found to be segregated or differentiated into two regions, an outer and bottom "fluffy" dark colored region and a light colored, hard, compact inner and upper region. The "fluffy" region appeared to be the region where most of the gaseous propylene polymerized under the initial low pressure conditions whereas the hard, compact region of polymer appeared to have been produced by the gradual polymerization of the liquid propylene in the main (later) stages of the polymerization. The two polymer regions were easily separated, each was homogenized and dried for the purposes of analysis. The polymer from the dark colored, "fluffy" region was found to weigh 29.6 grams whereas the polymer from the hard, compact region weighed 148.2 grams. Analysis by ignited sulfated ashing revealed that the "fluffy" region polymer, comprising 20.7% of the total polymer produced, contained 53.3% of the total ash whereas the hard, compact region polymer, comprising 79.3% of the total polymer contained only 46.7% of the total ash. Thus, the polymer from the "fluffy" region contained about four times as much catalyst contamination as did the main reaction product which demonstrates a high degree of catalyst segregation during the entire course of the reaction. A portion of the dried polymer from the light colored, hard region was mixed with 0.45% by weight of dilauryl-3,3-thiodipropionate and 0.05% by weight of tetraphenyl tin and then injection molded into ½ inch x ⅛ inch x 5 inch bars. This material was found to cause no corrosion in the dies or molding equipment nor did it darken when heated as is usually the case with polypropylene containing appreciable amounts of catalyst residue and this material was found to have the following physical properties:

Yield tensile strength (2 in./min.) __ 3630 p.s.i.
Elongation (2 in./min.) _____ 137%.
Flexural yield strength (2 in. span,
  0.05 in./min.) _____ 3487 p.s.i.
Flexural modulus of elasticity (2 in.
  span, 0.05 in./min.) _____ 105,000 p.s.i.
Izod impact strength _____ 4.9 ft. lb./inch of notch.

The polypropylene from the light colored, hard region was found to be 81% insoluble in boiling isooctane.

*Example II*

A stirred Parr bomb of 2000 ml. capacity was fitted with an internal cooling coil and provision was made for admitting liquid hydrocarbon solvent media (Lapp pulse feeder pump) or liquified propylene through the center-bottom portion of the sealed autoclave. To the pure nitrogen flushed autoclave were added 200 ml. of a highly purified isoparaffinic mixture boiling at 177–188° C., 45 ml. of a freshly stirred high surface area suspension of violet titanium trichloride in Decalin which was prepared by the procedure given in Example I, 3.05 ml. of a mixed 1.51 molar triethyl aluminum and 0.90 molar diethyl aluminum chloride in Decalin and 0.6 ml. of tri-n-butyl phosphine. Contact with chemically pure propylene was carried out in stages. First, the autoclave contents were heated to 50° C. under one atmosphere of nitrogen. Then, 10 p.s.i.g. of propylene pressure was applied with stirring for 5 minutes, followed by 40 p.s.i.g. of propylene for 10 minutes, and finally 135±10 p.s.i.g. of propylene for 10 minutes. During this time the reaction temperature was maintained at 60–70° C. In order to prevent the development of a solid plug of polymer in the bottom entry port, an estimated total of 130 ml. of additional isoparaffin was pumped into the reactor during this interval. The stirrer was then turned off and then about 250 ml. of liquified propylene was admitted through the bottom inlet tube over a period of about 17 minutes by means of nitrogen pressure, the reaction temperature being maintained at 60–75° C. After about a 7 minute interval during which 90 ml. of additional isoparaffin was pumped through the bottom port as a precaution against the development of a plug, an additional 250 ml. of liquified propylene was added through the bottom entry port over a period of about 15 minutes. The reaction was then allowed to continue for an additional 3.5 hours at about 70° C. The reaction mixture was then cooled and the excess propylene was vented off. The semi-solid crude mass was found to be highly differentiated or segregated into two separate regions. The portion apparently derived from the polymerization of the added liquid propylene was composed of a light colored, hard compact region that resembled a mushroom formation, including a hard "stem" rising from the bottom of the autoclave to the thick hard upper "cap" that made up a major portion of the polymer. A dark colored, some-what crumbly, loose region, obviously very rich in catalyst, about the outer region of the bottom "stem" of the hard compact mushroom apparently was principally derived from the initial stirred reaction with gaseous propylene. Separation and homogenization of the two polymer regions followed by analysis, revealed that the dark colored, crumbly, loose region yielded 63.5 g. of polymer and the light colored, hard, compact mushroom region yielded 119 g. of polymer. Analysis of these regions prior to any chemical washup revealed that the crumbly, loose region polymer, comprising 34.8% of the total polymer contained 81.7% of the total polymer ash whereas the hard, compact mushroom polymer, comprising 65.2% of the total polymer, contained only 18.3% of the total polymer ash. The former fraction was about eight times as rich in catalyst contamination as the main portion of the polymer. This again proves that a high degree of catalyst segregation has been obtained, particularly during the later stages of the polymerization. Thus, the main portion of the polymer of this example contained only about 0.025% chlorine.

The Decalin and/or the isoparaffin solvent used in the foregoing reaction may be completely replaced with any saturated low-boiling hydrocarbon.

We claim:
1. A process for preparing a solid alpha-olefin polymer which is substantially free of harmful residual catalyst which comprises:
 (A) polymerizing in an enclosed zone in a liquid hydrocarbon medium a gaseous alpha-olefin of the formula $R-CH=CH_2$ wherein R is a member of the group consisting of hydrogen and an alkyl group having from 1 to 12 carbon atoms at an alpha-olefin partial pressure of about 10 to 135 p.s.i.g. and at a temperature of from 38 to 90° C. with stirring and efficient cooling for a period of about 5 to 20 minutes in the presence of a four component catalyst consisting essentially of the reaction product of (1) a halide of a metal selected from the group consisting of Group IV(b), Group Vb and Group VI(b) metals, (2) an organoaluminum monohalide, (3) an organoaluminum hydrocarbon, and (4) an organic phosphine, the organic radicals of the foregoing catalyst components having from one to twelve carbon atoms, to form a crumbly, dark solid mixture of polypropylene and catalyst, and
 (B) under substantially static conditions polymerizing under autogenous pressure liquid alpha-olefin of the formula $R-CH=CH_2$ where R is a member of the group consisting of hydrogen and an alkyl group having from 1 to 12 carbon atoms onto the dark colored solid catalyst-poly alpha-olefin mixture at from about 50 to 90° C. for a period ranging from 1 to 24 hours to form ultimately a two-phase solid mass the minor phase of which is the crumbly, dark colored solid poly alpha-olefin-catalyst mixture and the major phase of which is a hard, light colored polymer low in residual catalyst contamination, and
 (C) mechanically separating the light colored hard polymer which is low in residual catalyst contamination from the dark colored catalyst-polymer mixture and drying said hard polymer.

2. The process of claim 1 wherein the catalyst component (1) is titanium trichloride.

3. The process of claim 2 wherein the catalyst component (2) is diethyl aluminum chloride.

4. The process of claim 3 wherein the catalyst component (3) is triethyl aluminum.

5. The process of claim 4 wherein the catalyst component (4) is tri-n-butyl phosphine.

6. The process of claim 5 wherein the alpha-olefin is propylene.

References Cited by the Examiner

UNITED STATES PATENTS

| | | | |
|---|---|---|---|
| 2,951,066 | 8/1960 | Coover et al. | 260—93.7 |
| 2,972,607 | 2/1961 | Coover et al. | 260—93.7 |
| 2,976,271 | 3/1961 | Lippincott et al. | 260—93.7 |
| 3,026,309 | 3/1962 | Coover et al. | 260—93.7 |

FOREIGN PATENTS 573,034  11/1958  Belgium.

JOSEPH L. SCHOFER, *Primary Examiner.*

FRED L. DENSON, *Assistant Examiner.*